INVENTOR
ALBERT F. MYERS
BY Cameron, Kerkam & Sutton
ATTORNEYS

June 24, 1969  A. F. MYERS  3,451,496
PLURAL AXLE VEHICLE WITHOUT TRANSFER CASE DIFFERENTIAL
MECHANISM THEREFOR
Filed June 7, 1967  Sheet 3 of 4

INVENTOR
ALBERT F. MYERS
BY
Cameron, Kerkam & Sutton
ATTORNEYS

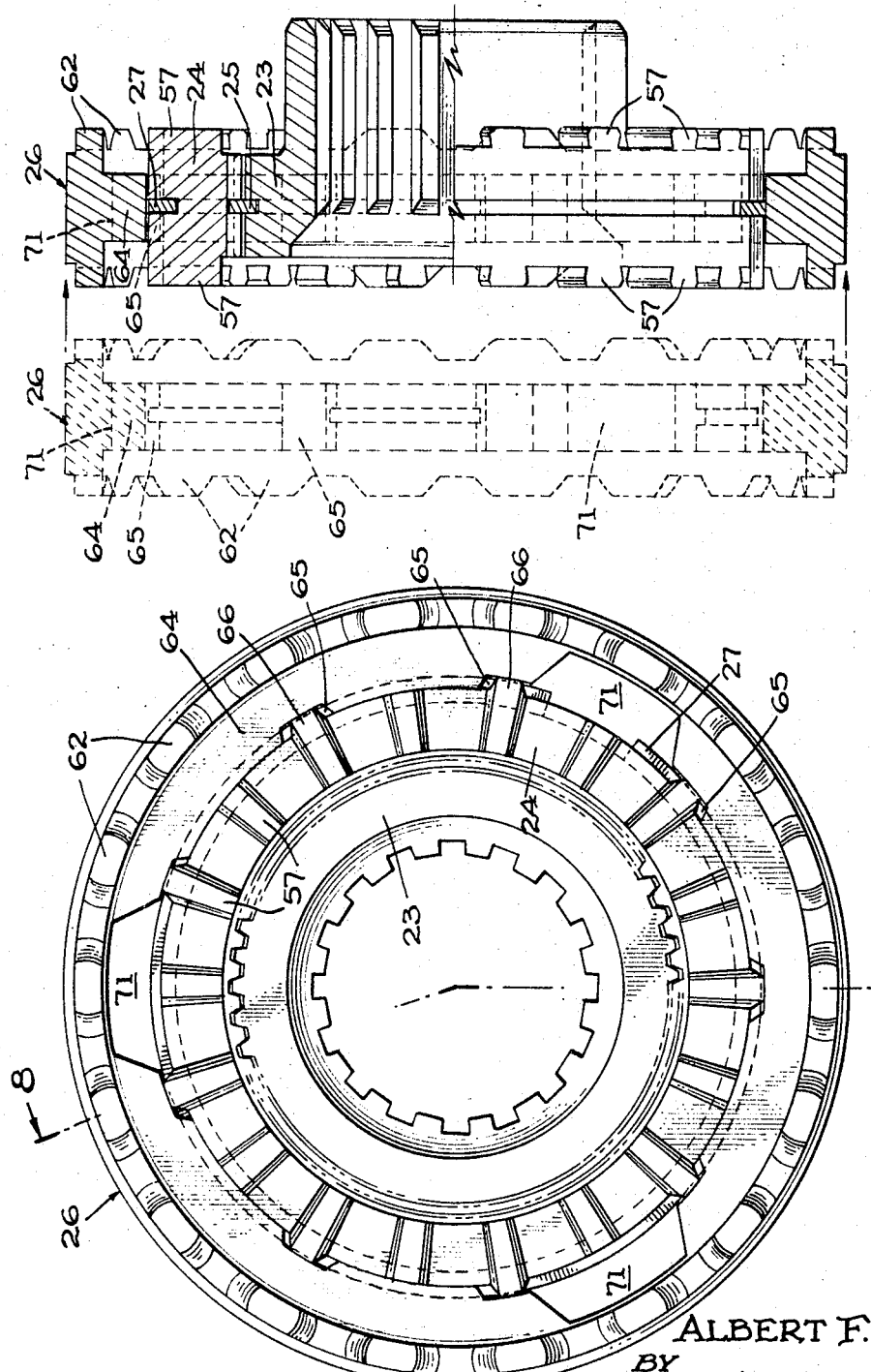

United States Patent Office 3,451,496
Patented June 24, 1969

3,451,496
PLURAL AXLE VEHICLE WITHOUT TRANSFER CASE DIFFERENTIAL MECHANISM THEREFOR
Albert F. Myers, Berkley, Mich., assignor to Boise Cascade Corporation, Boise, Idaho, a corporation of Delaware
Filed June 7, 1967, Ser. No. 644,240
Int. Cl. B62d *61/10;* F16h *35/04;* B60k *17/34*
U.S. Cl. 180—23                 8 Claims

ABSTRACT OF THE DISCLOSURE

A transfer case differential mechanism of the automatic overrunning or declutching type for an automotive vehicle having a plurality of driving axles wherein the power input to the differential is provided internally by a driving shaft which is coaxial with the elements of the differential, the outputs are delivered to parallel shafts, one of which is coaxial with the driving shaft, by an external gear and a side gear, respectively, and all of the parts of the differential are supported by the coaxial driving and driven shafts without the use of a conventional rotatable differential case.

Background of the invention

This invention relates to the driving mechanism of automotive vehicles of the type having a plurality of driving axles, and more particularly to an improved and simplified differential device of the automatic overrunning or declutching type for distributing driving torque between the driving axles. A differential of this type is normally installed in a transfer case or drop box fixed to the vehicle frame, and is commonly referred to as a transfer case differential.

Prior to the present invention, a number of differential mechanisms have been devised which comprise a central driving member, driven from the engine, having clutch teeth formed on the opposite sides thereof, a pair of driven members axially shiftable against spring pressure, having clutch teeth engageable with those of the driving member and driving connections to a plurality of axles, cooperating cam elements associated with the driving and driven members, respectively, which declutch and reengage each driven member when its associated axle overruns the driving member, and additional cam elements, commonly designated as holdout rings, which function to prevent reengagement of the declutched driven member as long as the overrunning continues. Two such differentials are disclosed in Patent No. 2,638,794, dated May 19, 1953. Differential mechanisms of this same general type adapted especially for transfer case use have also been provided, such as those disclosed in Patent No. 2,667,087, dated Jan. 26, 1954.

Although these prior devices have performed satisfactorily in many installations, they are not well adapted for use in transfer cases of limited size, or where the design of the vehicle is such that the driving torque from the engine cannot conveniently be transmitted to the differential through the conventional form of differential case wherein the elements of the differential mechanism are mounted.

Summary of the invention

The present invention resides in a transfer case differential of new and simplified construction which eliminates the rotatable differential case heretofore required, and enables the power input from the engine to be applied to the driving member of the differential internally thereof through a shaft which is coaxial with one of the driven output shafts of the transfer case. The invention also involves an improved arrangement of the elements of the differential such that all of the moving parts thereof are supported by the coaxial driving and driven shafts, and the overall size of the differential is decreased. The differential mechanism thus provided is therefore adapted for use in stallations for which the differentials of the prior art are unsuitable.

Brief description of the drawing

FIG. 7 is an end or face view of the driving member and associated cam member of the differential of FIG. 2, looking from the left in the latter figure; and FIG. 8 is a sectional view taken substantially on the line 8—8 in FIG. 7, with certain parts shown in full, and also including a phantom showing of the cam member as it would appear in section when removed from the driving member.

Description of the preferred embodiment

Figure 1:
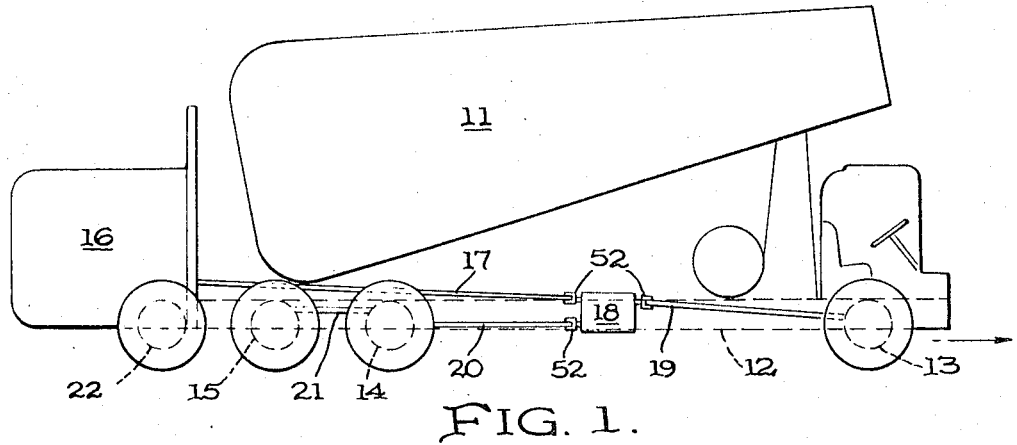
FIG. 1 is a diagrammatic representation of one form of automotive vehicle wherein the transfer case of the present invention is well adapted for use.

There is illustrated in FIG. 1 one type of automotive vehicle wherein the transfer case differential mechanism of the present invention may be used to advantage, this figure representing a truck adapted to support and transport a cement mixer drum 11 on a frame 12, and provided with a front driving axle 13 and a rear driving bogie comprising tandem driving axles 14 and 15. All three driving axles are driven from the engine 16, mounted on the rear end of frame 12, through a drive shaft 17 and a transfer case or drop box 18 carried by the frame at a position intermediate front driving axle 13 and the rear driving bogie. From transfer case 18, driving torque is transmitted to the front axle 13 through a shaft 19, and to the tandem driving axles 14 and 15 through a shaft 20. In the vehicle illustrated, rear axle 14 is driven directly by shaft 20, and transmits driving torque to rear axle 15 through a relatively short shaft 21. It will be understood that, if desired, the rear bogie may be provided with an interaxle gear case or transmission of known construction to which driving torque is transmitted by shaft 20 and from which is delivered to the tandem axles 14 and 15 individually. The rear end of frame 12 may also be provided with a trailing axle 22 to assist in supporting the weight of engine 16.

In order to enable either front axle 13 or tandem axles 14 and 15 to overrun while maintaining a positive drive to the other axle or axles, as when travelling over uneven ground or when the tire diameters are unequal, transfer case 18 is provided with a differential mechanism of the construction shown in FIGS. 2-8. This mechanism is so constructed that, when the front axle overruns the tandem axles, or vice versa, the driven member of the differential connected to the overrunning axle or axles is disengaged or declutched from the driving member and is maintained in disengaged or declutched position as long as the overrunning continues, but automatically returns to engaged or clutched position when the overrunning ceases.

Figure 2:
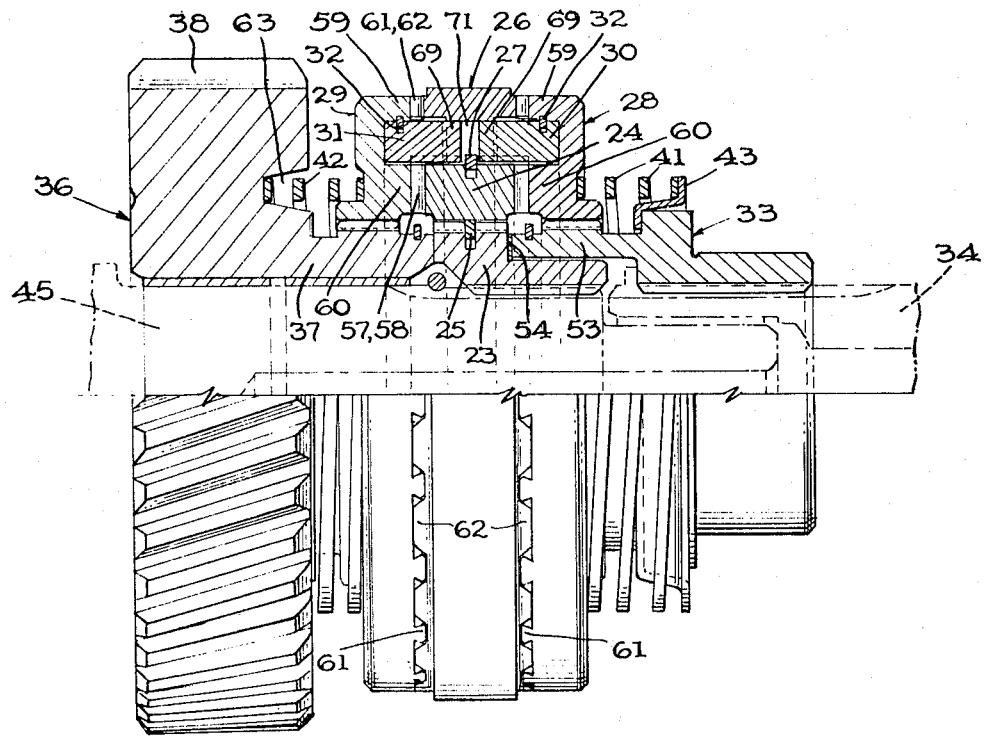
FIG. 2 is a side view, partially in section, of a preferred form of differential embodying the invention which may be used in the interaxle transfer case of the vehicle illustrated in FIG. 1.
Figure 3:
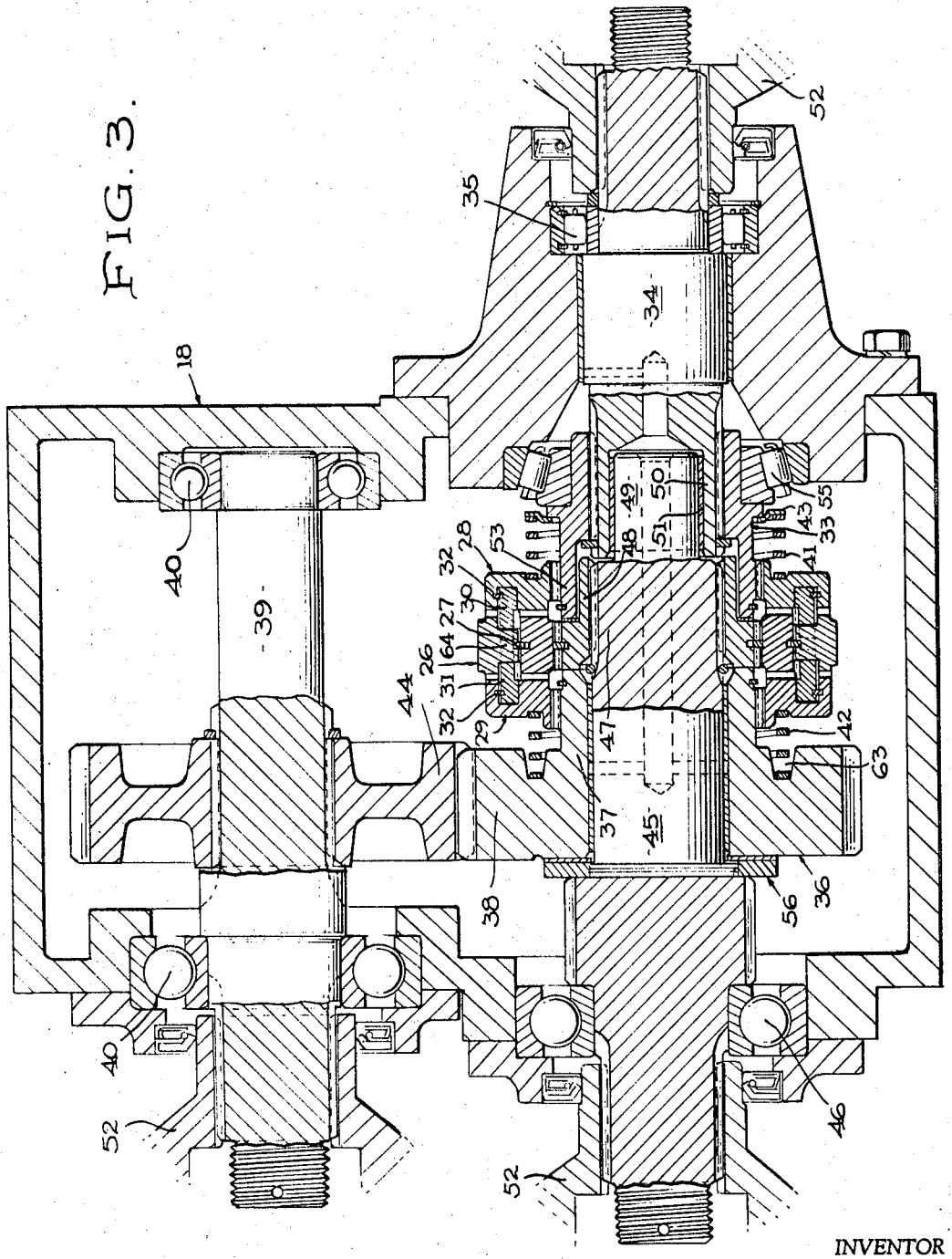
FIG. 3 is a sectional view of the differential of FIG. 2 installed in the transfer case of FIG. 1, the section being taken on a plane through the axes of the input and the output shafts which, in the vehicle illustrated, would be inclined to the horizontal at an angle of approximately 20°, it being understood that the vertical distance between the shafts is exaggerated in FIG. 1.

As hsown best in FIGS. 2 and 3, the differential mechanism comprises as its principal elements (a) a two-part driving member consisting of an inner member 23 and an outer member 24 which are splined to one another for rotation together and restrained against relative axial movement by a snap ring 25, (b) a center cam member 26 mounted on the outer periphery of outer driving member 24 for limited rotational movement relative thereto but restrained against relative axial movement by a snap ring 27, (c) a pair of combined clutch and cam members 28 and 29 located on opposite sides of and cooperating with outer driving member 24 and cam member 26, (d) a pair of holdout rings 30 and 31 rotatably mounted on the driven clutch and cam members 28 and 29, respectively, by means of snap rings 32, (e) a driven side member 33 which is externally splined to receive clutch and cam member 28 and internally splined to receive the inner end of a first output shaft 34 rotatably supported in transfer case 18 by a bearing 35, and which serves as a driving connection between clutch and cam member 28 and shaft 34, (f) a driven side member 36 having an externally splined hub portion 37 whereon clutch and cam member 29 is mounted and a helical gear portion 38, and which serves as a driving connection between clutch and cam member 29 and a second output shaft 39 rotatably mounted in case 18 in bearings 40, and (g) a pair of compression springs 41 and 42 and an associated spring retainer 43 which are so arranged as to yieldably urge the clutch and cam members into engagement with outer driving member 24 and center cam member 26. A helical gear 44 keyed to the second output shaft 39 completes the driving connection between the gear portion 38 of driven side member 36 and output shaft 39.

Driving torque is supplied to the differential mechanism in transfer case 18 from drive shaft 17 through an input shaft 45 which is rotatably supported in case 18 by a bearing 46 and is provided with an externally splined inner portion 47 on which the internally splined hub 48 of inner driving member 23 is mounted. Input shaft 45 is also provided with an extension 49 of reduced diameter which extends into the recessed inner end 50 of the first output shaft 34 with an intervening sleeve 51 so as to assist in maintaining the two shafts in axial alignment and in supporting the elements of the differential mechanism thereon. Input shaft 45 and output shafts 34 and 39 of the transfer case differential are operatively connected to the engine drive shaft 17 and axle driving shafts 19 and 20, respectively, in any suitable manner, as by universal joints 52 (FIG. 1), only fragments of which are shown in FIG. 3.

Inner driving member 23 is prevented from moving axially with respect to the splined portion 47 of input shaft 45 by abutment of hub 48 against the end faces of hub portion 37 of side member 36 and the externally splined portion 53 of side member 33, a thrust washer 54 preferably being inserted between the end faces of side member 33 and inner driving member 23. Side members 33 and 36 are in turn restrained against axial movement by the inner race of a thrust bearing 55 which rotatably supports side member 33 in case 18, and a thrust ring and washer unit 56 fixedly mounted on input shaft 45, respectively.

Referring now to FIGS. 5-8 in addition to FIGS. 2 and 3, outer driving member 24 is provided on each of its side faces with a set of driving clutch teeth 57, preferably slightly undercut and having beveled edges, which are adapted to engage similar driven clutch teeth 58 formed on the opposing side faces of the driven clutch and cam members 28 and 29. The spaces between the adjacent teeth of each set are wider than the clutch teeth themselves so as to facilitate disengagement of the teeth when one of the driven members is moved axially outwardly away from the driving member by operation of the cam members whenever the associated side member 33 or 36 begins to rotate at a greater velocity than driving member 24. Each of driven members 28 and 29 is also provided with a cam ring portion 59, spaced radially outwardly from the clutch portion 60 carrying the driven clutch teeth 58, which extends axially inwardly and is provided on its inner edge with a plurality of cam teeth 61 which are aligned with, and may conveniently be formed as extensions of, clutch teeth 58. Cam teeth 61 are adapted to cooperate with an equal number of cam teeth 62 formed on the side faces of center cam member 26 which are wider than teeth 61 and are provided with sloping sides on which the beveled edges of teeth 61 ride during the camming operation.

In order to enable outward axial movement of the driven clutch and cam members 28 and 29 relative to driving member 24 to effect disengagement of the driven clutch teeth 58 from driving clutch teeth 57 when overrunning occurs, members 28 and 29 are, as previously mentioned, internally splined and slidably mounted on similarly externally splined portions of driven side members 33 and 36. The springs 41 and 42, which are adapted to normally maintain the clutch and cam teeth of the driven members in engagement with the corresponding teeth of the driving member and center cam member, but which yield upon overrunning to permit disengagement of said teeth, surround the splined portions of driven members 33 and 36 with their inner ends thrusting against the outer side faces of the driven members and their outer ends abutting against the spring retainer 43, in the case of spring 41, and the bottom of an annular recess 63 formed in the inner side face of driven member 36, in the case of spring 42. Spring retainer 43 is held against outward movement by engagement of its radially inwardly directed flange with a shoulder formed on driven member 33.

As shown best in FIG. 8, center cam member 26 is in the form of a ring substantially T-shaped in cross-section, the radially inwardly extending portion 64 of the ring being supported on the outer peripheral surface of driving member 24 and adapted for limited rotational movement relative to the latter. To this end, the inner peripheral surface of portion 64 of the center cam member is provided with a plurality of relatively shallow, circumferentially spaced, equidistant transverse slots 65, nine in number in the embodiment illustrated, which slots receive key-like projections 66 extending radially outwardly from an equal number of the clutch teeth 57 of driving member 24. As illustrated in FIG. 7, the circumferential dimension of each slot 65 is greater than that of the cooperating key 66 so that, when the driving member and center cam member are in their normal positions, with the keys centered in the slots and the clutch teeth 57 in line with the cam teeth 62, the center cam may rotate a small amount in either direction relative to the driving member to accommodate backlash.

Assuming that both of the driven clutch and cam members 28 and 29 are fully engaged with the outer driving member 24 and center cam member 26, as indicated in FIGS. 2 and 3, overrunning of front axle 13 or rear axles 14 and 15 will automatically produce disengagement of the driving and driven cltuch teeth on that side of the differential corresponding to the overrunning axle or axles, due to the outward movement of the associated driven clutch and cam member produced by cam teeth 61 and 62 when said member begins to rotate at a greater speed than driving member 24.

Figure 4:
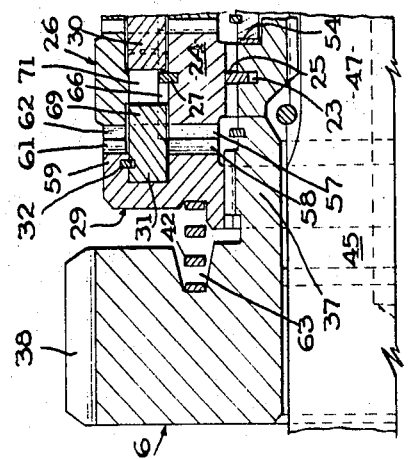
FIG. 4 is a fragmentary half-axial section of the left-hand portion of the differential of FIG. 2 showing the position of the parts when the rear driving axle or axles of the vehicle is or are overrunning.

For example, should the rear axles 14 and 15 pass over an obstruction while the wheels of the front axle 13 are still driving on substantially level ground, the increased speed of rotation of the wheels of the rear axles will be reflected by a corresponding increase in velocity of the shafts 20 and 39, gear 44, side member 36, and driven clutch and cam member 29 relative to driving member 24. As driven member 29 rotates ahead of the driving member, a movement made possible by the clearance between the driving and driven clutch teeth, the beveled edges of cam teeth 61 on the cam ring 59 of driven member 29 begin to ride up on the inclined sides of cam teeth 62 on the left-hand side of center cam member 26, the latter member being prevented from partaking of the increased speed of rotation of driven member 29 because the cam teeth on the right-hand side of the center cam remain fully engaged with the cooperating cam teeth on driven member 28 which continues to be driven by driving member 24 at the same speed as the latter. As the cam teeth of driven member 29 ride up on the teeth of the center cam member, member 29 is moved axially outwardly against the force of spring 42, sliding on the splined portion of its associated side member 36, until said cam teeth are fully disengaged and are riding in end-to-end relationship, at which time the left-hand set of driving and driven clutch teeth 57 and 58 are also completely disengaged and in end-to-end relationship, as shown in FIG. 4.

Were it not for the presence of the holdout rings 30 and 31, the construction and operation which are next to be described, continued overrunning of axles 14 and 15 would result in repeated engagement and disengagement of the clutch and cam teeth of member 29 with those of the driving and center cam members, with the consequent disadvantages inherent in this type of operation, such as increased wear of the cam and clutch teeth, spring fatigue and noise. However, by incorporation in the differential of holdout rings 30 and 31, the driven member on the overrunning side of the mechanism may be readily maintained in completely disengaged position as long as the overrunning continues, and will be automatically returned to the fully engaged position of FIGS. 2 and 3 as soon as overrunning ceases.

Figure 6:
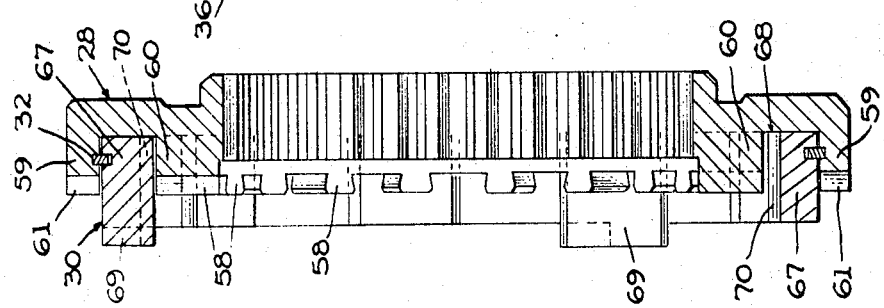
FIG. 6 is a sectional view taken substantially on the line 6—6 in FIG. 5.
Figure 5:
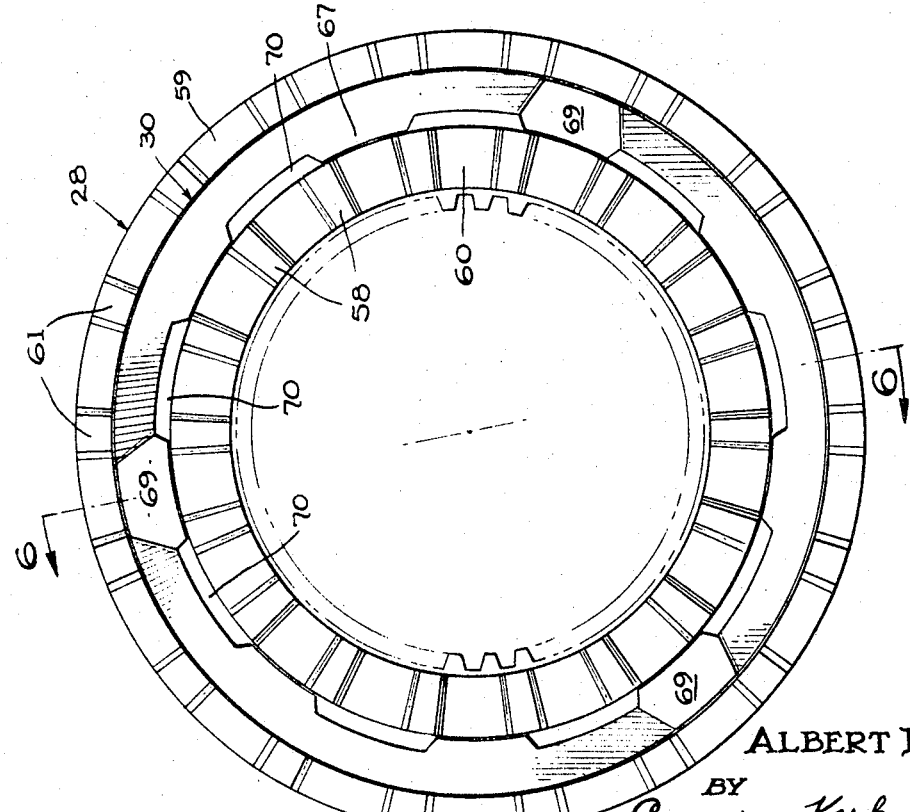
FIG. 5 is an end or face view of one of the driven clutch and cam members and associated holdout ring of the differential of FIG. 2.

In the preferred embodiment of the invention, the holdout rings 30 and 31 are of the form, and are mounted on the driven clutch and cam members in the manner, best illustrated in FIGS. 5 and 6. As shown, each ring comprises a circumferentially solid band 67 which is rotatably supported in an annular groove 68 formed in the inner face of the associated driven clutch and cam member, between the cam ring portion 59 and the clutch portion 60 thereof. The outer peripheral surface of band 67 is circumferentially slotted to receive the snap ring 32 which prevents axial displacement of the holdout ring relative to the clutch and cam member, while still permitting relative rotation therebetween, and also provides sufficient frictional resistance to such relative rotation to cause the two members to rotate together except when rotation of the holdout ring is positively prevented as hereinafter described. The inner edge of the holdout ring, i.e., the edge which extends inwardly toward the transverse center line of the differential beyond the plane of the driven clutch teeth 58 and cam teeth 61, is provided with a plurality of circumferentially spaced axially extending lugs 69, three in number in the structure illustrated, adapted to cooperate with the center cam member in the manner hereinafter described for the purpose of maintaining the clutch and cam member on the overrunning side of the differential in declutched or disengaged position.

As shown in FIG. 5, each lug 69 is substantially hexagonal in end view, the top and bottom parallel sides of the hexagon being coplanar with the outer and inner peripheries of the band 67, the radially outer non-parallel sides being substantially longer than the radially inner non-parallel sides, and the latter being coplanar with the adjacent end walls of two relatively shallow transverse slots 70 formed in the inner peripheral surface of band 67. In addition to the two slots 70 which lie adjacent each lug 69, three additional slots of the same size and shape are formed in the portions of band 67 intermediate lugs 69, thus providing a total of nine such slots equally spaced around the inner periphery of the holdout ring.

Referring now to FIGS. 7 and 8 in conjunction with FIGS. 5 and 6, all of which are drawn to substantially the same scale, it will be seen that the center cam member 26 has a radial thickness only slightly greater than the combined thickness of each holdout ring and the cam ring of the driven clutch and cam member on which it is mounted, so that the radially inner portion 64 of the center cam lies opposite and cooperates with the holdout rings, while the radially outer portion carrying cam teeth 62 lies opposite and cooperates with the cam ring portions 59 of the driven members. The radially outer portion of center cam member 26 is solid, while the radially inner portion 64 thereof is so machined as to form a plurality of relatively deep, circumferentially spaced, equidistant transverse slots 71, said slots being equal in number to the lugs 69 of the holdout rings and so cut that the end walls thereof are substantially parallel to, but are circumferentially spaced substantially further apart than, the radially outer sides of lugs 69. When the driving and driven members are in their normal, fully engaged positions, the lugs 69 of the holdout rings extend into and are centered with respect to the slots 71, so that the holdout rings may rotate in either direction relative to the center cam member when overrunning commences through an angular distance substantially equal to the angular distance through which the teeth of the driven member move relative to the teeth of the driving member in passing from fully engaged to disengaged position.

It will be noted from FIG. 7 that each of the slots 71 spans the distance between two of the relatively shallow slots 65 so that, in these instances, the shallow slots have only one end wall and open at the other end into slots 71. Since the keys 66 extend across the full width of driving member 24, as indicated in FIG. 8, they project into slots 70 of the holdout rings as well as slots 65 of the center cam member 26, and, when the parts are in their normal positions, are centered with respect to said slots. It will also be seen from FIGS 5 and 7 that the sides of keys 66 are inclined at the same angle as the end walls of slots 70 and the radially inner sides of lugs 69.

The function and method of operation of the holdout rings 30 and 31 will appear most readily from a consideration of FIGS 2–4, of which FIGS. 2 and 3 illustrate the relative positions of the holdout rings and the center cam member when both driven member are fully engaged with the driving member, while FIG. 4 indicates the relative positions of the same parts when the left-hand side of the differential is overrunning.

In the fully engaged condition of FIGS. 2 and 3, the cam teeth 61 of both driven members 28 and 29 are fully meshed with the teeth 62 of center cam member 26, and the lugs 69 of the holdout rings project into and are centered in the slots 71 in the center cam. Since at this time there is no force exerted on the holdout rings, other than inertia, tending to produce relative rotation between them and their respective driven members, the holdout rings rotate with the driven members without relative movement therebetween due to the frictional resistance to rotation provided by snap rings 32. If, however, the left-hand side of the differential begins to overrun and the driven clutch and cam member 29 rotates at a greater velocity than outer driving member 24, the cam teeth 61 of said driven member ride up on the lefthand set of teeth 62 of the center cam and cause the overrunning driven member to move axially outwardly and disengage the left-hand set of clutch teeth 57 and 58.

During the time that the cam teeth 61 of the overrunning driven member are riding up the inclined sides of center cam teeth 62, the holdout ring 31 on the overrunning driven member continues to move with the latter, forwardly with respect to the center cam member. As this forward movement continues, the end faces of lugs 69 of the holdout ring come into overlapping relationship with the side surface of the radial portion 64 of center cam 26 and slide thereon for a short distance until the advancing radially inner sides of the lugs come into abutment with the sides of keys 66, whereupon the holdout ring 31 becomes immobilized with respect to the center cam and the driven member 29 rotates relatively to the holdout ring as long as its rotational velocity exceeds that of the driving member 24. In this connection, it should be noted that the distance to which lugs 69 extend into slots 71 is slightly less than the height of cam teeth 61 and 62, so that disengagement of the cam teeth moves the lugs 69 completely out of slots 71.

When overrunning of the left-hand side of the differential ceases, the speed of rotation of driven member 29 decreases until it reaches and then tends to drop below that of driving member 24 and the rest of the elements then rotating with the latter, including the center cam and holdout ring 31. As soon as the speed of driven member 29 becomes less than that of the driving member, i.e., when the latter begins to move ahead of the former, the holdout ring 31 again takes up the movement of the driven member due to the friction effect of snap ring 32 and because there is no longer any force positively opposing such movement. As driven member 29 and holdout ring 31 drop rearwardly relative to the driving member and center cam, the lugs 69 of the holdout ring move back off the side surface of portion 64 of the center cam until they again come into registry with slots 71, at which time the driven member is free to return to the fully engaged position of FIGS. 2 and 3 under the influence of spring 42, as soon as its cam teeth 61 come opposite the spaces between the cam teeth 62 of the center cam.

Due to the symmetrical construction of the holdout rings and the center cam, and the clearances provided between the sides of keys 66 and lugs 69 and the end walls of grooves 65 and 71, the differential functions in the same manner irrespective of which of the driven members overruns and irrespective of the direction of rotation of the driving member, i.e., whether the vehicle is driving ahead or backing.

Although the mode of operation of the differential of the present invention is similar to that of such prior devices as those disclosed in Patents Nos. 2,638,794 and 2,667,087, the structure here involved is simpler and more compact than those previously known, the conventional rotatable differential case is eliminated, and all of the moving elements of the differential are supported by the input driving shaft and a coaxial output driven shaft, an arrangement which also applies the power input to the differential internally through the center thereof, instead of externally through a rotatable case. There is thus provided a differential of improved construction which is usable in transfer case installations for which the differentials of the prior art are not adapted.

I claim:

1. In a vehicle having a plurality of axles adapted to be differentially driven from the engine of the vehicle, a transfer case carried by the vehicle, a driving shaft driven by the engine extending into and rotatably supported by said transfer case, a pair of driven shafts rotatably supported by and extending outwardly from said transfer case in opposite directions for driving the axles, one of said driven shafts being coaxial with said driving shaft, a driving member mounted on and rotatable with said driving shaft having two sets of driving clutch teeth on the opposite side surfaces thereof, a center cam member rotatably mounted on the outer periphery of said driving member having two sets of cam teeth on the opposite side surfaces thereof, a pair of driven members rotatable about the axis of said driving shaft but axially immovable relative thereto, said driven members being drivingly connected to said driven shafts, a pair of axially movable clutch and cam members splined to said driven members, each of said clutch and cam members having a set of driven clutch teeth engageable with one set of the driving clutch teeth on said driving member for transmitting driving torque from said driving member to the associated driven member, and a set of cam teeth cooperating with one set of the cam teeth on said center cam member for causing axial separation of said clutch and cam member and said driving member and disengagement of the clutch teeth thereof when the associated driven member overruns the driving member, and a holdout ring mounted on each of said clutch and cam members and cooperating with said center cam member for maintaining axial separation of said clutch and cam member and said driving member so long as the associated driven member overruns the driving member.

2. A vehicle as claimed in claim 1 wherein the inner end of one of the driving and the coaxial driven shafts is journaled in the inner end of the other of said shafts, the driving member is splined to the driving shaft, one of the driven members is splined to the coaxial driven shaft, and the other driven member is rotatably mounted on the driving shaft and geared to the other driven shaft.

3. A vehicle as claimed in claim 1 including means for so connecting said holdout rings to said clutch and cam members that said rings are fixed against axial movement relative to said members and normally rotate therewith, but are capable of rotational movement relative thereto after said members have been axially separated from said driving member, and means carried by said driving member for preventing further rotation of the holdout ring mounted on the clutch and cam member associated with the overrunning driven member after said clutch and cam member has become axially separated from said driving member.

4. A vehicle as claimed in claim 3 wherein each of the holdout rings includes a plurality of circumferentially spaced slots in the inner periphery thereof, and the rotation preventing means carried by the driving member comprises a plurality of transversely extending keys projecting radially outwardly from the outer periphery of said driving member and into said slots, the circumferential extent of each slot being greater than the width of the associated key to permit a limited amount of rotational movement of each holdout ring relative to the driving member.

5. A vehicle as claimed in claim 1 wherein said center cam member includes a radially inwardly extending portion having a plurality of circumferentially spaced slots formed therein, and each of said holdout rings includes a plurality of axially extending lugs which project into said slots when the clutch and cam teeth of the clutch and cam member on which the ring is mounted are engaged with the clutch teeth of the driving member and the cam teeth of the center cam member, and which are withdrawn from said slots and moved into engagement with a side face of the radially extending portion of the center cam member when the driven member associated with the clutch and cam member on which the ring is mounted overruns the driving member.

6. A vehicle as claimed in claim 5 wherein the end faces of said lugs partially overlap and abut the side faces of the radially extending portion of the center cam member during overrunning.

7. A vehicle as claimed in claim 1 wherein each of the holdout rings includes a plurality of circumferentially spaced slots formed in the inner periphery thereof, the driving member includes a plurality of transversely extending keys projecting radially outwardly from the outer periphery thereof and into said slots, and the center cam member includes a radially inwardly extending portion having a plurality of circumferentially spaced slots formed therein, each of said holdout rings also including a plurality of axially extending lugs which project into the slots in said center cam member when the clutch and cam teeth of the clutch and cam member on which the ring is mounted are engaged with the clutch teeth of the driving member and the cam teeth of the center cam member, and which are withdrawn from said slots and rotated relatively to the center cam member until the end faces of said lugs partially overlap and abut a side face of the radially extending portion of the center cam member, and the sides of said lugs abut the sides of the keys on said center cam member, when the driven member associated with the clutch and cam member on which the ring is mounted overruns the driving member.

8. A vehicle as claimed in claim 1 wherein the driving member comprises an inner part splined to the driving shaft and an outer part splined to the inner part, the two sets of driving clutch teeth being formed on the opposite side surfaces of said outer part, and including means for preventing axial movement of said inner and outer parts relative to one another and relative to the driving shaft.

References Cited
UNITED STATES PATENTS

| | | |
|---|---|---|
| 2,638,794 | 5/1953 | Knoblock _____ 74—650 |
| 2,667,087 | 1/1954 | Myers. |
| 2,667,088 | 1/1954 | Myers _____ 74—650 |

A. HARRY LEVY, *Primary Examiner.*

U.S. Cl. X.R.

74—650; 180—44

PO-1050
(5/69)

UNITED STATES PATENT OFFICE
CERTIFICATE OF CORRECTION

Patent No. 3,451,496          Dated June 24, 1969

Inventor(s) Albert F. Myers

It is certified that error appears in the above-identified patent and that said Letters Patent are hereby corrected as shown below:

In the title, "WITHOUT" should read --WITH--.
Column 2, line 7, "stallations" should read --installations--.
Column 3, line 9, "hsown" should read --shown--.

SIGNED AND
SEALED
NOV 4 1969

(SEAL)
Attest:

Edward M. Fletcher, Jr.
Attesting Officer

WILLIAM E. SCHUYLER, JR.
Commissioner of Patents